United States Patent Office 3,444,408
Patented May 13, 1969

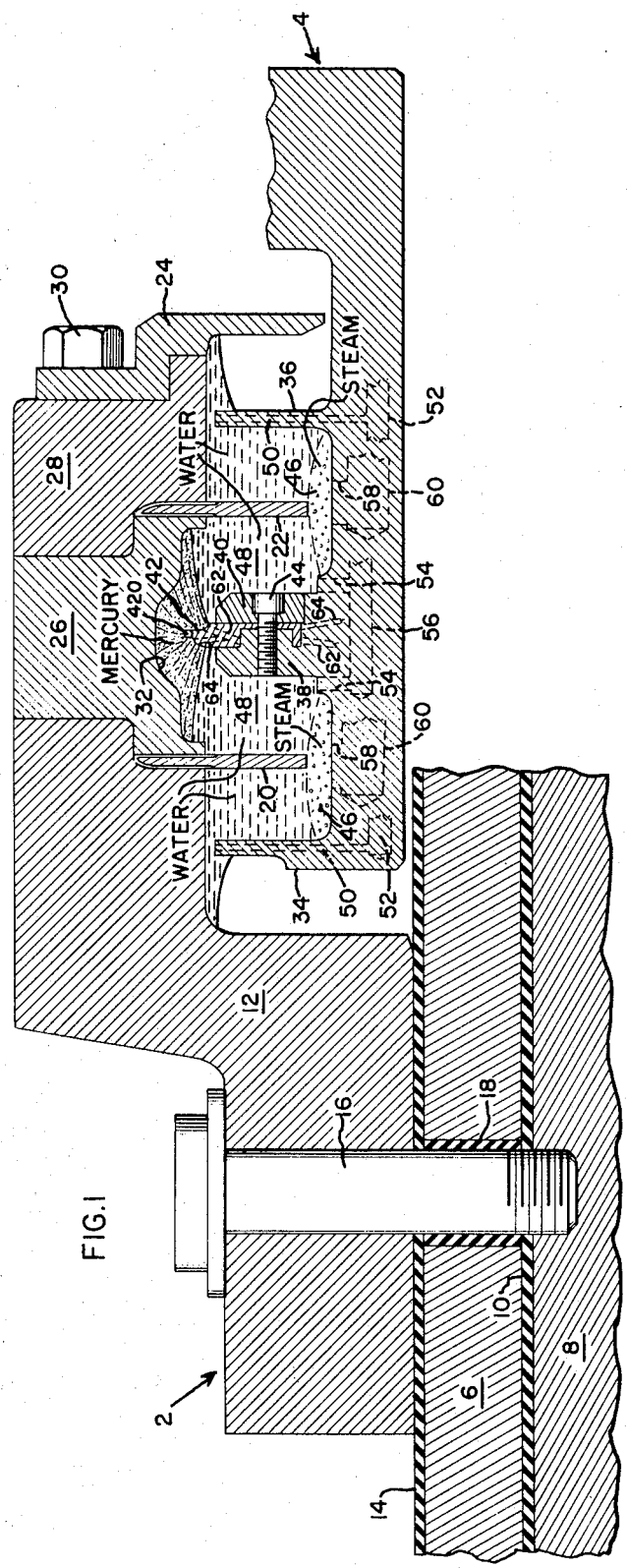
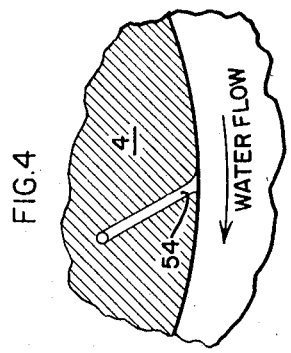
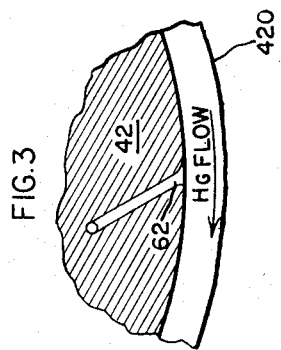

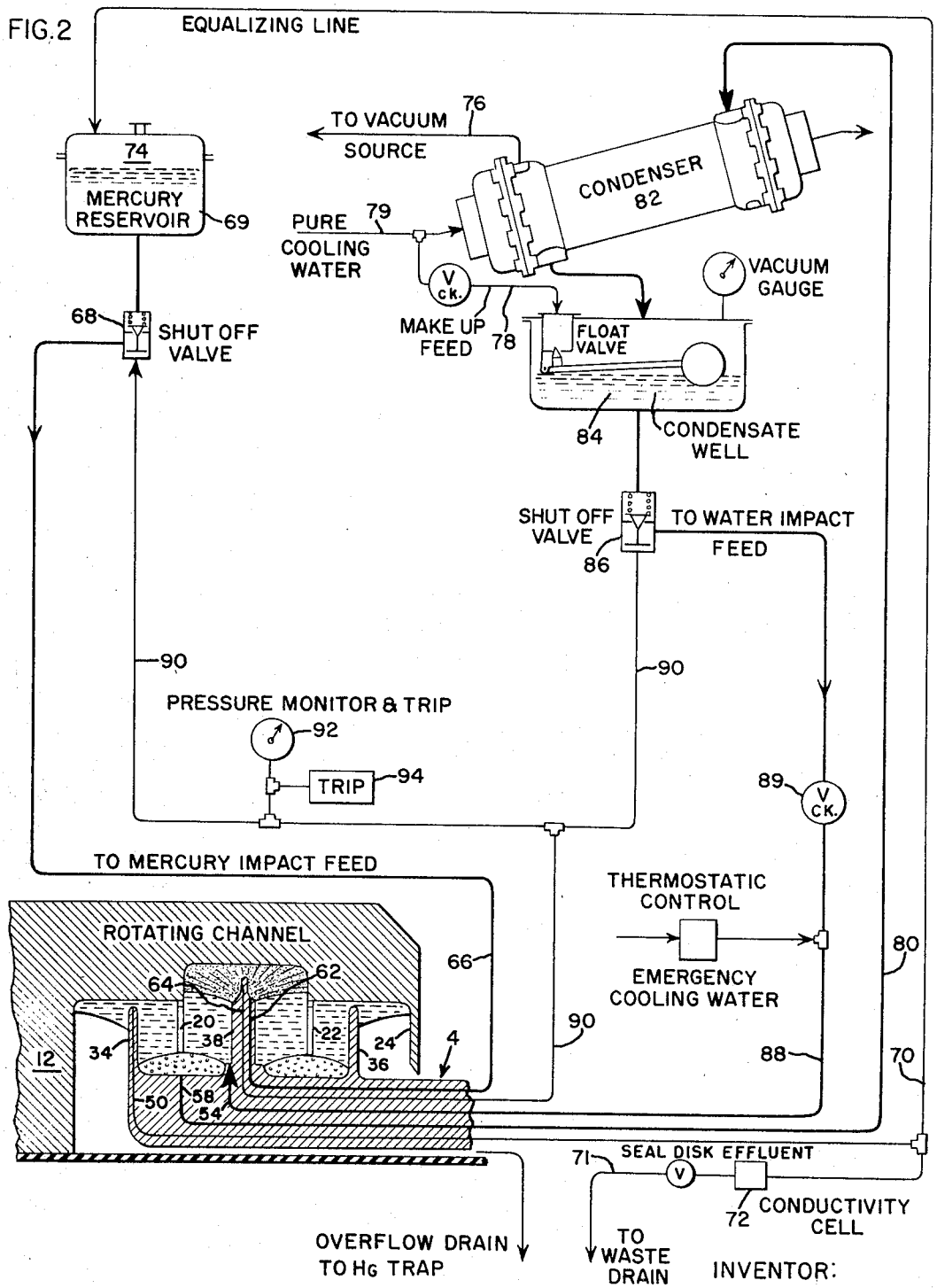

3,444,408
LIQUID METAL ELECTRICAL COLLECTOR
Gerd E. Krulls, Scotia, N.Y., assignor to General Electric Company, a corporation of New York
Filed Aug. 25, 1967, Ser. No. 663,286
Int. Cl. H02k 9/28
U.S. Cl. 310—227    7 Claims

ABSTRACT OF THE DISCLOSURE

Electrical collector using liquid metal to conduct electricity between rotating and stationary member in dynamoelectric machine where liquid metal is isolated from atmosphere by a liquid coolant and seal.

BACKGROUND OF THE INVENTION

This invention is related to electrical collector apparatus in general, and more particularly to electrical collectors connecting rotating and stationary members through a fluid conductive medium.

In dynamoelectric machines, it has long been conventional practice to transmit electric current from a stationary member to a rotating member by means of carbon brushes. As current densities have increased, carbon brushes have become less suitable and recent developments have included the use of a liquid metal disposed between the stationary member and the rotating member to transmit the current therebetween.

Metals that are typically used in such liquid metal collectors are mercury, sodium, potassium, and other liquid metal mixtures. Due to some of the properties of these materials, for example the poisonous nature of mercury vapors, and the oxidation of mercury, it is desirable to provide a liquid metal collector having provision for sealing the collector metal to prevent its escape and for cooling it to limit or prevent its vaporization.

Accordingly, it is an object of the present invention to provide an improved liquid metal electrical collector having a provision for sealing of the liquid metal from the atmosphere.

Another object of this invention is to provide an improved liquid metal electrical collector having a provision for cooling of the collector metal.

Another object of this invention is to provide an improved liquid metal electrical collector having a combined sealing and cooling provision for the liquid metal.

Other objects, advantages and features of the present invention will become apparent from the following description of one embodiment thereof, when taken in connection with the accompanying drawing.

SUMMARY OF THE INVENTION

Briefly, the present invention is practiced in one form by a rotating annular channel member having a concave inner surface surrounding a stationary disk shaped member. The rotating channel contains a liquid metal which is in contact with the peripheral portion of the disk member, to transmit current from the stationary disk to the rotating cup. The rotating channel member also contains water which in operation gravitates to a location radially inward of the mercury isolating the same from the atmosphere. Heat is removed from the system by removing steam from the channel and for introducing condensate water thereto. Means are also provided for regulating the level of mercury in the system, and for supplying make-up water to replace that which is lost on the air side or the seal or through leakage.

BRIEF DESCRIPTION OF THE DRAWING

In the drawing:
FIG. 1 is a longitudinal view, partly in section, of a liquid metal collector apparatus, above the centerline, according to the present invention.
FIG. 2 is a view substantially similar to FIG. 1 showing in addition the fluid system connected to the stationary element,
FIG. 3 is a schematic representation of the flow of mercury relative to the tip of the collector stationary terminal, and
FIG. 4 is a schematic representation of the flow of water adjacent the tips of water feed passages on the stator member.

DESCRIPTION

Referring now to FIG. 1, a rotating collector element 2 is shown disposed relative to a stationary collector element 4. Rotating element 2 includes a hollow dynamoelectric machine shaft 6 having a plurality of conductors 8 disposed in its central bore and insulated from the shaft 6 by a cylindrical insulation 10. A collector rotor 12 is mounted on shaft 6 and insulated therefrom by insulation 14. Collector rotor 12 is electrically connected to a shaft conductor 8 by means of a conducting bolt member 16 which is in turn insulated from shaft 6 by means of insulation 18.

Collector rotor 12 includes a plurality of disk members or seal rings 20, 22 and 24 axially spaced thereon and separated from one another by members 26 and 28. Rotor member 12 and members 26 and 28, and seal ring 24 are held firmly together by a suitable fastening means such as bolt and nut 30. Member 26 is an annular ring having a concave inner surface or channel 32 constituting a liquid metal container. Similarly, the totality of collector rotor members 12, 26, 28 and 24 constitute an annular concavity or channel member to contain sealing and cooling water.

Stationary element 4 has a pair of similar radially projecting seal disk elements 34 and 36 extending therefrom. Intermediate the seal disks 34 and 36 is a radially extending circumferential flange 38. A separate ring member 40 is mountable to flange 38 for the purpose of securing thereto an annular conductor blade member 42. Conductor blade member 42 is an annular ring and extends radially toward the concave surface 32 of liquid metal channel member 26. Ring member 40 and conducting blade 42 are mounted to the flange 38 by means of a suitable fastener such as 44.

Between seal disk 34 and flange 38, and between flange 38 and seal disk 36, adjacent the body of stationary element 4, are spaces 46 generally designated as steam spaces. Between steam spaces 46 and the mercury space in channel member 26, is a space 48 generally designated water space.

Within seal disks 34 and 36, one or more effluent passages 50 extend from the circumferential surface substantially radially inward toward the central or body portion of stationary element 4. Passages 50 communicate at their inner ends with one or more longitudinal water effluent passages 52, drilled in a substantially axial direction along element 4. Similarly, one or more feed passages 54 on each side of flange 38 extend from water space 48 inwardly to a longitudinally extending passage 56 which is drilled in a substantially axial direction along stationary member 4. In like manner, there are steam passages 58 extending radially inward from steam spaces 46 to longitudinal steam passages 60 which are drilled axially along stationary member 4. In the same way, a mercury feed passage 62 extends from a radially outward portion of conductor blade 42 and communicates at its radially inward end with a longitudinal passage, not shown. Also, a mercury pressure sensing passage 64 extends from a radially outer portion of conductor blade 42 and extends radially inward to a central axial passage, not shown. Mercury pressure sensing passage 64 opens into the mercury cup area at a point radially outward relative to the opening point of mercury feed passage 62, yet radially inward of the extreme end of conductor blade 42.

FIG. 2 shows schematically the rotor 2 and stator 4 of the liquid metal electrical collector of FIG. 1. For the sake of clarity, there is only one each of lines 50, 54 and 58 shown in FIG. 2, it being understood that on the opposite side of flange 38, there is a substantially duplicate set of passages. FIG. 2 shows the operative relationship between the fluid passages shown in FIG. 1 and the external components to which these fluid passages connect.

Water effluent passages 50 connect through an equalizing line 70 to a conductivity cell 72 and also to a water chamber 74 in a mercury reservoir 69.

Steam passage 58 leads directly to external steam passage 80 which conducts steam directly into a steam condenser 82. Condensate from condenser 82 leads through a conduit into a condensate well 84 which includes a float valve to maintain a liquid level therein. Condensate well 84 communicates with a shutoff valve 86. Shutoff valve 86 in turn communicates with a condensate supply line 90, containing a one-way check valve 92 and leading to water feed passage 54 in the collector.

Mercury feed passage 62 communicates with mercury feed line 66 which in turn communicates by way of mercury shutoff valve 68 with a mercury reservoir 69. Mercury shutoff valve 68 and water shutoff valve 86 are pressure operated by pressure from mercury pressure sensing line 90 which communicates with mercury pressure sensing passage 64 in the conductor blade 42. Pressure in line 90 keeps valves 68 and 86 open so that the water reservoir 84 and the mercury reservoir 69 communicate with their respective feed lines 88 and 66. A pressure monitor and an over-pressure trip mechanism, as schematically represented at 92 and 94 respectively, may be used to measure and record mercury pressure in the collector. Trip mechanism 94 trips the excitation breakers (not shown) in the event that the mercury level gets too low (possible flashover) or too high (possible overheating), the mercury level being related to this pressure.

A source of vacuum pressure, not shown, is connected through line 76 to the interior of condenser 82. Also, a makeup feedline 78 is short-circuited from cooling water line 79 to the condenser well 84.

The tip or peripheral portion 420 of conductor blade 42 may be composed of a metal other than that of the blade 42, such as molybdenum, for the purpose of improved electrical conductivity from the tip through the mercury and to the collector rotor 12. The material used at the periphery should be one that is wetted by mercury. This will insure good electrical contact and minimize the shear between blade and mercury.

FIG. 3 shows schematically, an axial view of the stationary conductor blade 42 and its peripheral portion 420, and the flow of mercury relative thereto when the collector apparatus of this invention is in operation.

FIG. 4 is a similar axial schematic representing a stationary water feed passage 54 and the flow of water relative thereto when the collector is in operation.

OPERATION

In operation, the above-described liquid metal collector transfers exciting current from an exciter to the rotor of a dynamoelectric machine as follows: When dynamoelectric machine shaft 6 and consequently the collector rotor 12 are spinning, the liquid metal or mercury in channel member 26 is spinning therewith. The mercury is in constant contact with the tip or periphery 420 of the stationary conductor blade 42 which is in electrical contact through stationary element 4 with the generator exciter, not shown. That is, current is transmitted from the exciter through the stationary element 4, through conductor blade 42, through the mercury and through channel member 26 and collector rotor 12 to conducting bolt 16 and to shaft conductor 8, thence to the rotor windings, not shown. There is enough mercury in the system so that there is contact between blade 42 and channel member 26 at all speeds including standstill. Conversely, there is not so much mercury in the system that there is overflow beyond the seal disks 20 and 22 at standstill.

Also rotating with the collector rotor 12 is the sealing water occupying the water space 48. The sealing water performs three major functions in the present invention. First, the water seals the mercury preventing its loss by vaporization or otherwise to the atmosphere. Secondly, the heat generated by the passage of current through the mercury as well as by the friction due to the relative motion of rotor, mercury and stator, is absorbed by the sealing water. This heat generates steam in the sealing water which, being lighter than the water, moves to occupy steam spaces 46. Steam from spaces 46 is constantly given off through steam passages 58, and through steam lines 80 to the external steam condenser 82 which may be maintained at an appropriate vacuum level to motivate proper flow. Thus heat is continually removed from the mercury-water system. Thirdly, the sealing water performs the function of preventing oxidation of the mercury. This is accomplished by sealing the mercury from air and also by the condenser 82 which communicates with a source of vacuum for the maximum removal of air and noncondensibles from the steam generated in the water spaces 48.

The operation of the liquid controls will now be described.

When rotating channel 32 is moving, the mercury contained therein becomes pressurized due to centrifugal force. This pressure is sensed in sensing passage 64 and in sensing line 90, which pressure acts upon condensate shutoff valve 86 and mercury shutoff valve 68 to open the same. That is, as soon as there is slight pressure in mercury sensing line 90, the mercury and condensate shutoff valves are opened and remain open during operation.

With mercury shutoff valve 68 open, mercury reservoir 69 is in communication with mercury feedline 66 and mercury feed passage 62 in the conductor blade 42. As will be appreciated from a consideration of FIG. 3, mercury will flow through feed passage 62 until the mercury level in the channel 32 is sufficiently deep so as to stop the flow in passage 62 by the impact of the mercury flow relative thereto. Passage 62 is inclined somewhat against the direction of mercury flow so that this will take place.

Similarly, with condensate shutoff valve 86 open, condensate well 84 is in communication with condensate feed line 88 and with water feed passages 54. Again, as will be apparent from FIG. 4, water will flow outwardly from feed passage 54 when there is space in the water flow area to accommodate it.

In both the mercury and water feed systems above described, the flow of the liquids into their respective feed passages 62 and 54 is motivated by an elevation head which results from the positioning of the mercury and condensate reservoirs at an appropriate height above the rotating channel 32.

In addition to the mercury elevation head, the pressure in the mercury reservoir 69 is maintained at a level substantially equal to that of the rotating water through equalizing line 70. Line 70 communicates with water effluent passages 50 which sense water pressure at their extremities at approximately the same radial distance from the axis of the system as that of mercury feed passage 62. Thus the mercury level is regulated and mercury is not allowed to back up from the rotating cup into feed passage 62. The substantially equal water pressure in chamber 74 and the added pressure due to the column of mercury in line 66 prevent it from backing up.

Drain line 71 communicates with effluent passages 50 for the purpose of removing water from the effluent lines. Conductivity cell 72 is used to monitor the rate of formation of mercuric oxide, if any, and its dissolution into the effluent water. The rate of effluent is set slightly higher than that required to carry off the small amount of oxide which forms.

As heat is generated in the mercury and water, steam is formed which is taken off, motivitated by its own pressure, through steam passages 58 and steam lines 80 to the condenser 82. Condensate from condenser 82 is returned in the form of feedwater through condensate valve 86 and water feed line 88 to water feed passages 54, discharging into water spaces 48 under the influence of the condensate elevation head.

By the use of the electrical collector according to the present invention, a minimum amount of mercury can be used due to the fact that the mercury is isolated and sealed from the atmosphere preventing its vaporization and oxidation, and none is required in the external cooling loop. The system is effectively cooled by transfer of heat to the sealing water, which heat is absorbed in the change of phase of the water to steam. The small amount of effluent water is provided for the dual purpose of carrying off dissolved oxides and for monitoring the rate of mercuric oxide formation. The connection of the condenser to a vacuum source effectively removes air and noncondensibles from the condensate and further is a positive protection against mercury contamination of station cooling water since, if a tube leakage occurred, resulting flow would be from the cooling water system to the vacuum or steam side of the condenser.

In view of these features and advantages, it will be apparent that a liquid metal electrical collector has herein been disclosed which provides improved mercury cooling and sealing, and improved protection from oxidation of the mercury as compared to prior art provisions.

It may occur to others of ordinary skill in the art to make modifications of this invention which will remain within the concept and scope thereof and will not constitute a departure therefrom. For example, instead of the blade member being stationary and the channel member being rotatable, the blade could be rotatable within the stationary channel with fluid passages suitably placed in the stationary channel member. Accordingly, it is intended that the invention be not limited by the details in which it has been described but that it encompass all within the purview of the following claims.

What is claimed is:
1. An electrical collector for electrically connecting a rotating and a stationary member, comprising
   an electrically conductive annular channel member disposed relative to an axis,
   an electrically conductive annular blade member disposed about said axis and inward of said annular channel,
   said blade member and said channel member being rotatable, relative one to the other,
   a quantity of electrically conductive fluid disposed in said channel member, said fluid being held within said channel and in contact with said blade member when there is relative rotation between said blade and channel members, and
   a quantity of a non-conductive fluid similarly disposed and held within said channel, said non-conductive fluid having a lower specific gravity than said conductive fluid, such collector being known to the prior art and characterized by the improvement including:
      means to cool said collector comprising a first conduit to introduce said non-conductive fluid to said channel and a second conduit to remove said non-conductive fluid from said channel.
2. The improvement defined in claim 1 wherein said annular blade member is disposed between a plurality of annular disk members, said blade and disk members being mounted to a common member so that they define annular steam collecting chambers.
3. The improvement defined in claim 1 wherein said first conduit includes a stationary water passage communicating with said channel on each side of said blade member and said second conduit includes a stationary vapor passage communicating with said channel on each side of said blade member, said vapor passage and said water passage being disposed in a series circuit, said circuit further including means to condense vapor removed from said channel and means to motivate water flow into said channel.
4. The improvement defined in claim 3 in which said circuit maintains a quantity of water disposed above said collector to motivate water flow, and said improvement further includes a stationary passage communicating with said annular channel and with a source of said conductive fluid so as to keep a positive pressure head on the conductive fluid within said annular channel.
5. An electrical collector apparatus comprising
   (a) a rotatable annular channel member defining an annular concavity on its radially inner portion,
   (b) a stationary annular blade member disposed concentrically within said annular concavity,
   (c) a quantity of mercury disposed in said concavity and in contact with said blade member,
   (d) a quantity of water disposed in said concavity,
   (e) stationary conduits disposed in a series circuit to introduce water to and to remove vapor from said concavity, said circuit including means to condense said vapor and means to motivate water flow, and
   (f) means to regulate the quantity of mercury disposed within said concavity, said means including:
      a passage extending through said blade member communicating at one end with the mercury in said concavity near the periphery of said blade and at the other end with a source of mercury, and
      a coaxial seal disk member axially spaced from said blade member, a passage extending through said seal disk member communicating at one end with the water in said concavity and at the other end with said source of mercury, said source of mercury being disposed above said collector apparatus to maintain a suitable pressure head to keep said blade member immersed in mercury at its periphery.
6. An electrical collector apparatus according to claim 5 in which said stationary annular blade member includes a peripheral portion substantially composed of molybdenum.
7. An electrical collector apparatus according to claim 5 in which said stationary annular blade member is disposed between a pair of said seal disk members, said blade and seal disk members being mounted to a common member and defining steam collecting chambers therebetween.

References Cited

UNITED STATES PATENTS

| | | | |
|---|---|---|---|
| 970,407 | 9/1910 | Von Ugrimoff. | |
| 2,786,155 | 3/1957 | Sellers | 310—219 X |
| 2,828,431 | 3/1958 | Klaudy | 310—178 |
| 2,845,554 | 7/1958 | Schwab | 310—219 X |
| 3,168,666 | 2/1965 | Grobel | 310—219 |
| 3,312,843 | 4/1967 | Krulls | 310—178 X |

MILTON O. HIRSHFIELD, *Primary Examiner.*

E. SUTTON, *Assistant Examiner.*

U.S. Cl. X.R.

310—178, 232